US009870469B2

(12) United States Patent
Crowe

(10) Patent No.: US 9,870,469 B2
(45) Date of Patent: Jan. 16, 2018

(54) MITIGATION OF STACK CORRUPTION EXPLOITS

(71) Applicant: McAfee, Inc., Santa Clara, CA (US)

(72) Inventor: Simon Crowe, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 586 days.

(21) Appl. No.: 14/497,789

(22) Filed: Sep. 26, 2014

(65) Prior Publication Data
US 2016/0092676 A1 Mar. 31, 2016

(51) Int. Cl.
G06F 21/54 (2013.01)

(52) U.S. Cl.
CPC ........ *G06F 21/54* (2013.01); *G06F 2221/033* (2013.01)

(58) Field of Classification Search
CPC ....................................... G06F 21/54
See application file for complete search history.

(56) References Cited

U.S. PATENT DOCUMENTS

| 4,847,902 | A | * | 7/1989 | Hampson | G06F 21/123 |
| | | | | | 711/E12.02 |
| 5,987,610 | A | | 11/1999 | Franczek et al. | |
| 6,073,142 | A | | 6/2000 | Geiger et al. | |
| 6,460,050 | B1 | | 10/2002 | Pace et al. | |
| 7,506,155 | B1 | | 3/2009 | Stewart et al. | |
| 7,581,089 | B1 | * | 8/2009 | White | G06F 9/4426 |
| | | | | | 712/242 |
| 2002/0126848 | A1 | * | 9/2002 | Uyama | H04L 12/58 |
| | | | | | 380/255 |
| 2003/0172293 | A1 | * | 9/2003 | Johnson | G06F 21/50 |
| | | | | | 726/22 |
| 2003/0217277 | A1 | * | 11/2003 | Narayanan | G06F 21/52 |
| | | | | | 713/187 |
| 2004/0168078 | A1 | | 8/2004 | Brodley et al. | |
| 2007/0180524 | A1 | | 8/2007 | Choi et al. | |
| 2014/0173293 | A1 | * | 6/2014 | Kaplan | G06F 21/54 |
| | | | | | 713/190 |
| 2014/0281529 | A1 | * | 9/2014 | Epp | H04L 63/0428 |
| | | | | | 713/168 |

FOREIGN PATENT DOCUMENTS

| WO | 2014124806 A1 | 8/2014 |
| WO | 2016048547 A1 | 3/2016 |

OTHER PUBLICATIONS

International Search Report and Written Opinion in International Application No. PCT/US2015/046874 dated Dec. 8, 2015.
International Preliminary Report on Patentability issued in PCT Application No. PCT/US2015/046874 dated Mar. 28, 2017; 11 pages.

* cited by examiner

*Primary Examiner* — William Powers
(74) *Attorney, Agent, or Firm* — Patent Capital Group

(57) ABSTRACT

In an example, a stack protection engine is disclosed for preventing or ameliorating stack corruption attacks. The stack protection engine may operate transparently to user-space processes. After a call to a subroutine from a parent routine, the stack protection engine encodes the return address on the stack, such as with an exclusive or cipher and a key selected from a key array. After the subroutine returns control to the main routine, the stack protection engine decodes the address, and returns control. If a stack corruption attack occurs, the malicious return address is not properly encoded, so that when decoding occurs, the program may simply crash rather than returning control to the malicious code.

21 Claims, 12 Drawing Sheets

MITIGATION OF STACK CORRUPTION EXPLOITS

FIELD OF THE DISCLOSURE

This application relates to the field of computer security, and more particularly to a stack protection engine for mitigation of stack corruption exploits.

BACKGROUND

A stack corruption exploit is a malware (or potentially negligent) attack wherein a malicious process overwrites a return address on the memory stack with the address of a malware process after a parent routine has issued a call to a subroutine. When the subroutine is finished executing and issues a RET instruction, control may then pass to the malware process, providing an attacker access to system resources.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
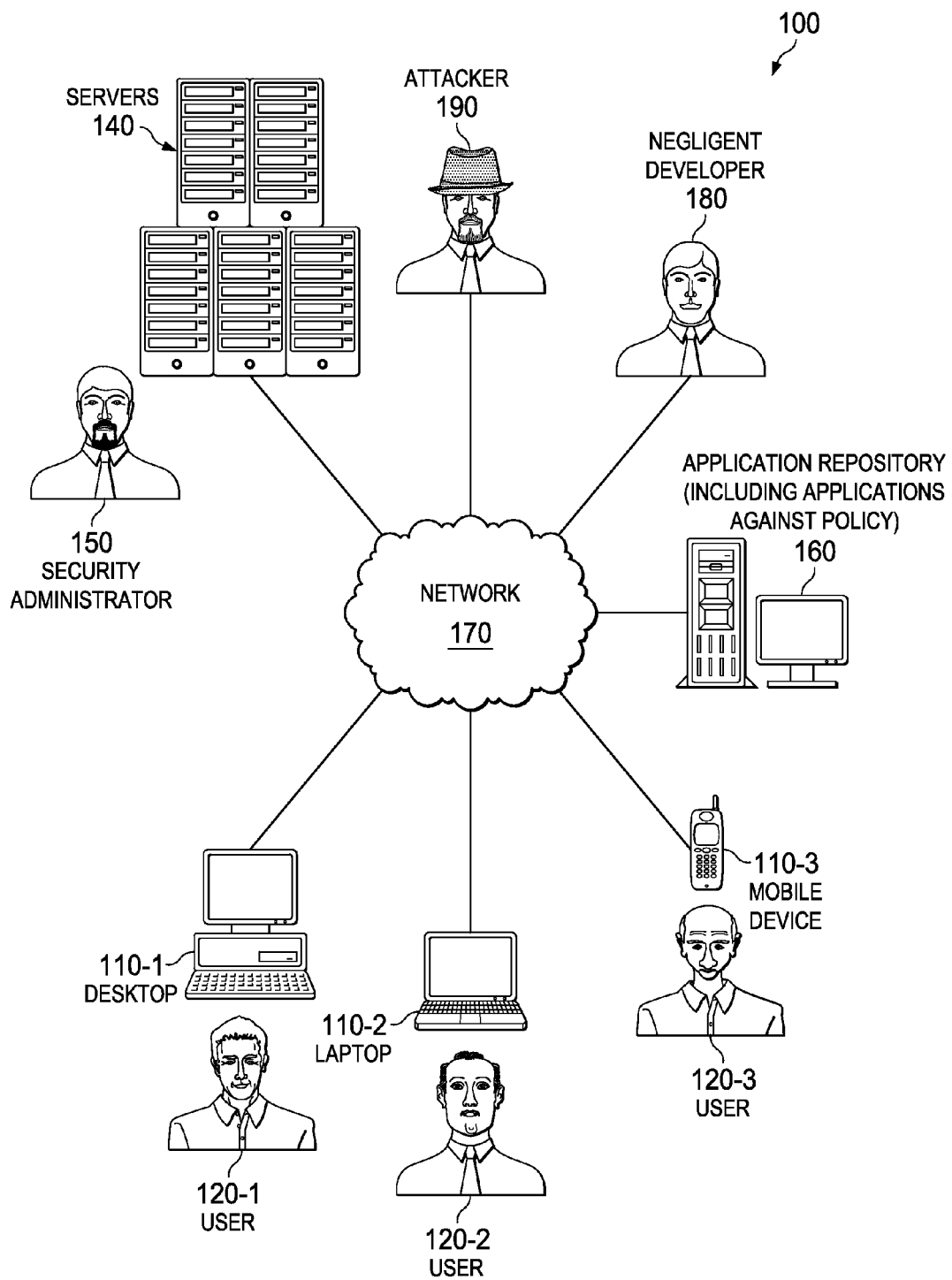
FIG. 1 is a network level diagram of a user network according to one or more examples of the present Specification.

In an example, a stack protection engine is disclosed for preventing or ameliorating stack corruption attacks. The stack protection engine may operate transparently to userspace processes. After a call to a subroutine from a parent routine, the stack protection engine encodes the return address on the stack, such as with an exclusive or cipher and a key selected from a key array. After the subroutine returns control to the main routine, the stack protection engine decodes the address, and returns control. If a stack corruption attack occurs, the malicious return address is not properly encoded, so that when decoding occurs, the program may simply crash rather than returning control to the malicious code.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

This Specification describes a system and method for mitigating stack corruption exploits. The methods disclosed herein may, in some cases, be used in conjunction with or as a component of a comprehensive security solution. For example, a security solution may include antivirus, antimalware, antispyware, and/or other components designed to protect the security and privacy of end users and enterprises.

But even when such comprehensive security measures are deployed, computer security is a constant and evolving arms race between security architects and "black hats" who try to compromise security. A security solution may be concerned with mitigating software that contains inadvertent security flaws, which may inherently be problematic, or which may provide attack vectors for black hats. Finally, within an enterprise (or within the context of a family where parents are concerned about their children's computer usage), a security architect must guard against software that is not per se harmful, but that is contrary to enterprise or family policy.

The methods disclosed in this Specification may be used alone, or in conjunction with a comprehensive security solution. When used in conjunction with a comprehensive security solution, these methods provide a "failsafe" mechanism that may be necessary, for example, in the case of a "zero-day" exploit, where a program's harmful effects are not discovered until they are activated in an attack. In other cases, the methods disclosed herein may be built into a microprocessor, so that stack corruption exploits are inherently mitigated, regardless of whether other security measures are deployed.

In an example method of this Specification, a stack protection engine is provided to intercept a stack corruption exploit or other malware. As described herein, a stack corruption exploit may occur when a main routine issues a call to a subroutine. When the main routine calls the subroutine, the main routine places a number of parameters on the "stack" portion of memory. In many cases, the stack is a last-in first-out (LIFO) buffer, with the return address being placed on the stack first. Thus, the subroutine may "pop" all of the other parameters off of the stack and operate on them as necessary. After finishing its work and preparing a return value, the subroutine may return control to the main routine by popping the last value—the return address—off of the stack, and using it as an operand for a return ("RET") instruction provided by the processor architecture.

The stack corruption malware watches for this event, and upon detecting that the main routine has issued a call to the subroutine, and before the subroutine finishes executing its process, the malware overwrites the return address that was first placed on the stack. The new return address provided by the malware may be an address to a malicious subroutine provided by the malware author. Thus, when the subroutine is ready to return control to the main program, it pops the value that it believes to be the correct return address off of the stack, and then issues a RET instruction with that address as the operand. However, the RET instruction now points to the malware subroutine. Thus, the malware subroutine gains access to malicious system resources. The problem may be even more severe when the parent process is executing with elevated privileges. In that case, the malware subroutine may inherit those elevated privileges from the parent subroutine. Thus, a targeted stack corruption exploit may specifically watch for a subroutine call by a process with elevated system privileges so that it can inherit those privileges and have greater freedom to do its malicious work on the system.

According to the methods of this Specification, stack corruption exploits can be prevented or ameliorated. This is done by a providing a background process, which may be provided in software or firmware, or which may be encoded in hardware of the microprocessor, that encodes the return address with a reversible encoding before it is placed on the stack. Once the subroutine is finished executing and issues a RET instruction, the return address provided in the operand is decoded before control is returned to that address.

If malware has tampered with the return address in the interim, then decoding of the return address will fail. Specifically, in one embodiment, the processor need not make any special effort to determine whether the address has been tampered with, but rather simply decodes the address. If the address has been tampered with, then the return address will be garbage. Even if the garbage address is a valid memory address, in a contemporary system with megabytes or gigabytes of available memory, it is astronomically unlikely that the garbage address will point to a valid subroutine or otherwise perform some useful work.

Thus, without the stack protection engine described herein, the worst-case result of a stack corruption exploit is that a subroutine called by a main routine with elevated privileges returns control to a malicious subroutine that then has unfettered access to the user's system. In contrast, the worst-case scenario of a system with a stack protection engine as described herein is that the return address will be garbage, and the process will crash. Furthermore, as the stack protection engine becomes more popular, malware authors will recognize that the value of a stack corruption exploit is minimal. Thus, there will be little motivation to write new stack corruption exploits. With fewer stack corruption exploits in the wild, the danger of even crashing after a stack corruption attempt will be substantially lowered.

A stack protection engine, with associated systems and methods, will now be discussed with more particular reference to the appended FIGURES, which disclose one or more embodiments by way of non-limiting example.

FIG. 1 is a network level diagram of a distributed security-enabled network 100 according to one or more examples of the present Specification. In the example of FIG. 1, a plurality of users 120 operates a plurality of computing devices 110. Specifically, user 120-1 operates desktop computer 110-1. User 120-2 operates laptop computer 110-2. End user 120-3 operates mobile device 110-3. Each computing device may include an appropriate operating system, such as Microsoft Windows, Linux, Android, Mac OSX, Apple iOS, Unix, or similar. Some of the foregoing may be more often used on one type of device than another. For example, desktop computers, which may also be engineering workstations, may be more likely to use one of Microsoft Windows, Linux, Unix, or Mac OSX. Laptop computer 110-2, which is usually a more-portable off-the-shelf device with minimal customization, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. Also connected to network 170 are one or more servers 140, an application repository 160, and human actors connecting through various devices, including for example an attacker 190 and a developer 180. Servers 140 may be configured to provide suitable network services including certain services disclosed in one or more examples of the present Specification.

It may be a goal of users 120 to successfully operate their respective computing devices 110 without interference from attacker 190 and developer 180. In one example, attacker 190 is a malware author whose goal or purpose is to cause malicious harm or mischief. The malicious harm or mischief may take the form of installing root kits or other malware on computing devices 110 to tamper with the system, installing spyware or adware to collect personal and commercial data, defacing websites, operating a botnet, operating a spam server, or simply to annoy and harass users 120. Thus, one aim of attacker 190 may be to install his malware on one or more computing devices 110. As used throughout this Specification, malicious software ("malware") includes any virus, trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Developer 180 may also operate on network 170. Developer 180 may not have malicious intent, but may develop software that poses a security risk. For example, a well-known and often exploited security flaw is the so-called buffer overrun, in which a malicious user such as attacker 190 is able to enter an overlong string into an input form and thus gain the ability to execute arbitrary instructions or operate with elevated privileges on a computing device 110. Buffer overruns may be the result, for example, of poor input validation or incomplete garbage collection, and in many cases arise in nonobvious contexts. Thus, although not malicious himself, developer 180 may provide an attack vector for attacker 190. Applications developed by developer 180 may also cause inherent problems, such as crashes, data loss, or other undesirable behavior. Developer 180 may host software himself, or may upload his software to an application repository 160. Because software from developer 180 may be desirable itself, it may be beneficial for developer 180 to occasionally provide updates or patches that repair vulnerabilities as they become known.

Application repository 160 may represent an "app store" or other network service providing users 120 the ability to interactively or automatically download and install applications on computing devices 110. Developer 180 and attacker 190 may both provide software via application repository 160. If application repository 160 has security measures in place that make it difficult for attacker 190 to distribute overtly malicious software, attacker 190 may instead stealthily insert vulnerabilities into apparently beneficial applications.

In some cases, one or more users 120 may belong to an enterprise. The enterprise may provide policy directives that restrict the types of applications that can be installed, for example from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer.

In another example, user 120 may be a parent of young children, and wish to protect the young children from undesirable content, such as pornography, adware, spyware, age-inappropriate content, advocacy for certain political, religious, or social movements, forums for discussing illegal or dangerous activities, by way of non-limiting example.

Thus, it is a goal of users 120 to configure and operate computing devices 110 while limiting or eliminating potentially unwanted content (PUC), including the species of PUC described above. Computing devices 110 may include services for identifying and eliminating PUC, and servers 140 may provide additional network-based services that are configured to enforce policies, and otherwise assist computing devices 110 in excluding PUC.

Figure 2:
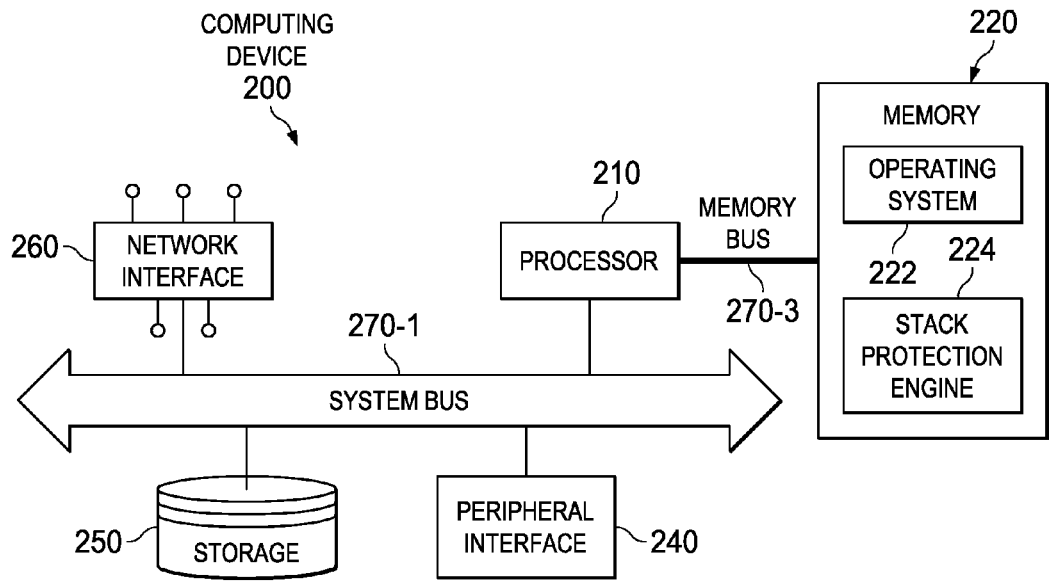
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and stack protection engine 224. Other components of client device 110 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of stack protection engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 13:
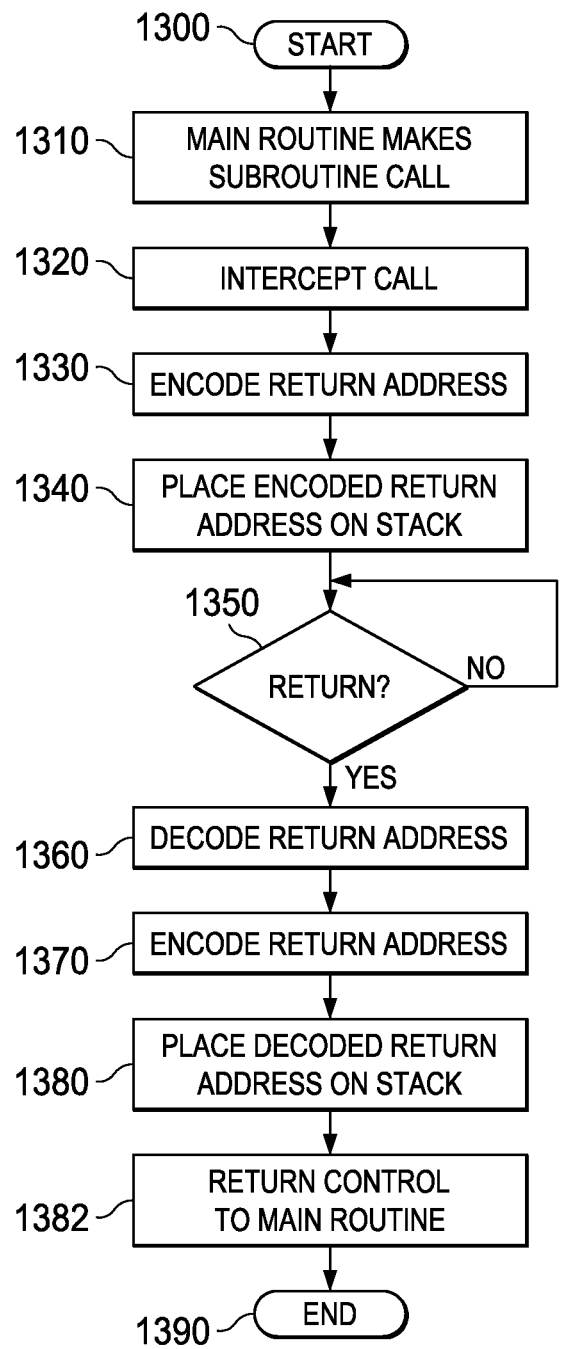
FIG. 13 is a flow chart of a method according to one or more examples of the present Specification.

Stack protection engine 224, in one example, is a utility or program that carries out a method, such as method 1300 of FIG. 13, or other methods according to this Specification. Stack protection engine 224 may be, in various embodiments, embodied in hardware, software, firmware, or some combination thereof. For example, in some cases, stack protection engine 224 may include a special integrated circuit designed to carry out a method or a part thereof, and may also include software instructions operable to instruct a processor to perform the method. In some cases, software portions of stack protection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In other cases, stack protection engine 224 may reside wholly within hardware of processor 210, and may operate completely (and in some cases purposefully) invisible to software routines. It should also be noted that stack protection engine 224 is provided by way of non-limiting example only, and that other hardware and software, including interactive or user-mode software, may also be provided in conjunction with, in addition to, or instead of stack protection engine 224 to perform methods according to this Specification.

In one example, stack protection engine 224 includes executable instructions stored on a non-transitory medium operable to perform method 1300 of FIG. 13, or a similar method according to this Specification. At an appropriate time, such as upon booting client device 110 or upon a command from operating system 222 or a user 120, processor 210 may retrieve a copy of stack protection engine 224 (or software portions thereof) from storage 250 and load it into memory 220. Processor 210 may then iteratively execute the instructions of stack protection engine 224.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
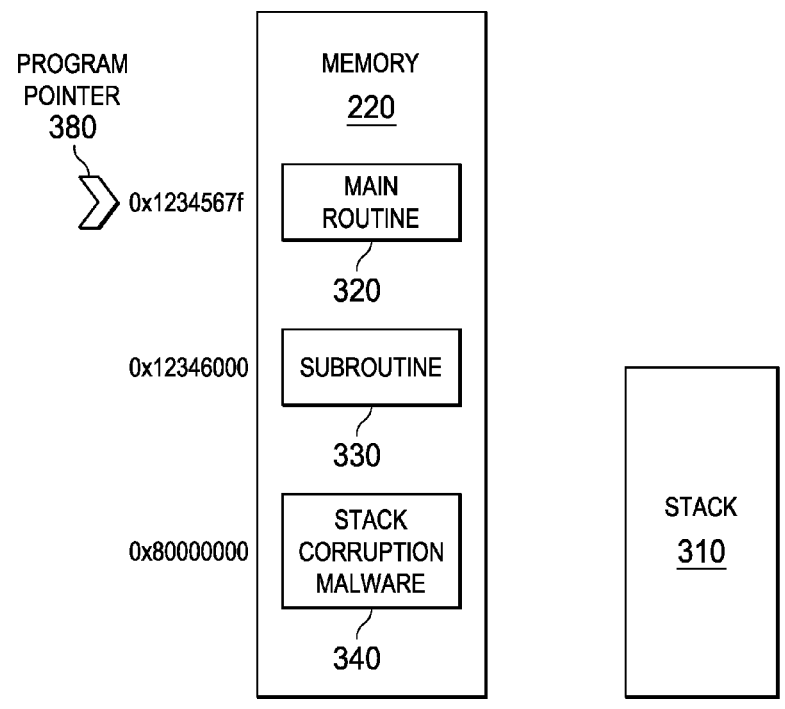
FIG. 3 is a block diagram of a computing operation according to one or more examples of the present Specification.

In FIG. 3, memory 220 is shown with a main routine 320, a subroutine 330, and stack corruption malware 340. Stack 310 may be a LIFO buffer, and may be provided in various embodiments in memory or in internal registers.

A program counter 380 currently points to main routine 320. In this example, main routine 320 is legitimate software running with elevated system privileges, and subroutine 330 is a legitimate subroutine of main routine 320. Stack corruption malware 340 has been covertly inserted into memory 220 by attacker 180. Main routine 320 resides at address 0x1234567f. Subroutine 330 resides at address 0x12346000. Stack corruption malware 340 resides at address 0x80000000. Thus, in a correctly-operating subroutine call, main routine 320 will call subroutine 330, and when subroutine 330 is finished, a RET instruction with the operand 0x1234567f will execute, returning program pointer 380 to that address. Conversely, in a successful malware corruption attack, main routine 320 will place address 0x1234567f onto the stack as the return address, and stack corruption malware 340 will then overwrite this value with 0x80000000. When subroutine 330 is finished executing in that case, the operand of the RET instruction will be 0x8000000, and control will pass to stack corruption malware 340.

In more detail, the stack corruption exploit works as follows. Program pointer 380 points at main routine 320, located at memory location 0x1234567f. In this example, a 64-bit addressing scheme is used by way of nonlimiting example, but to simplify the FIGURES, only the least significant 32 bits of each 64-bit address are shown. Notably, the teachings of the present Specification are not limited to 64-bit addressing. Other addressing schemes, such as by way of nonlimiting example, 8-but, 16-bit, 24-bit, 32-bit, 40-bit, 48-bit, 64-bit, or 128-bit, may also be used.

Figure 4:
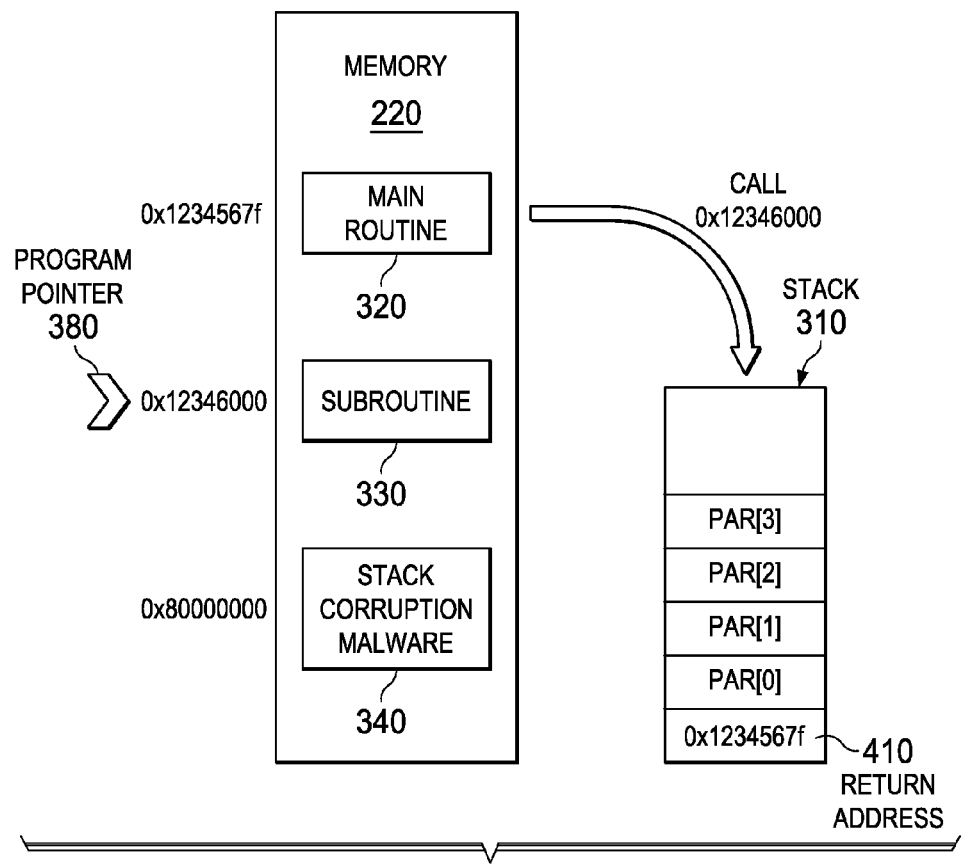
FIG. 4 is a block diagram of a computing operation according to one or more examples of the present Specification.

In FIG. 4, main routine 320 calls subroutine 330. In doing so, main routine 320 first "pushes" return address 0x1234567f onto stack 310 at return address position 410. Return address 410 may be a special register designated specifically for holding return addresses, and may always be used as the implied operand to a RET instruction. By pushing the value 0x1234567f onto return address 410, main routine 320 ensures that the RET instruction will receive the correct operand. Main routine 320 then pushes four additional parameters onto stack 310: parameter 0, parameter 1, parameter 2, and parameter 3. Program pointer 380 now has the value 0x12346000.

Figure 5:
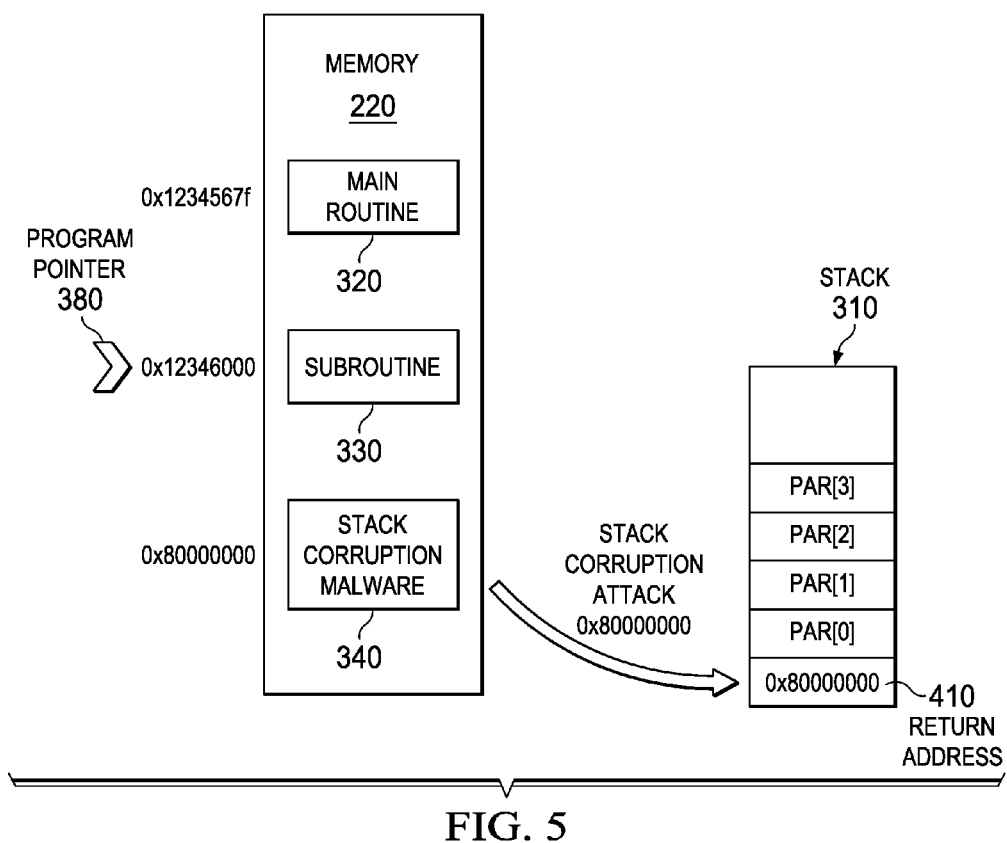
FIG. 5 is a block diagram of a computing operation according to one or more examples of the present Specification.

In FIG. 5, while subroutine 330 is executing (i.e., program pointer 380 is still iterating through the instructions of subroutine 330), stack corruption malware performs its stack corruption attack by overwriting return address 410 with its preferred value of 0x80000000. Thus, when subroutine 330 issues a RET instruction, it will use the value 0x80000000 as the operand. Note that although they are shown together in this FIGURE for simplicity, the address of the malicious routine and the address of code that actually attacks return address 410 may not be the same. In this example, address 0x800000000 is the address of the malware instructions that will perform the malicious work. The instructions for attacking return address 410 may be located in any suitable position in memory 220.

Figure 6:
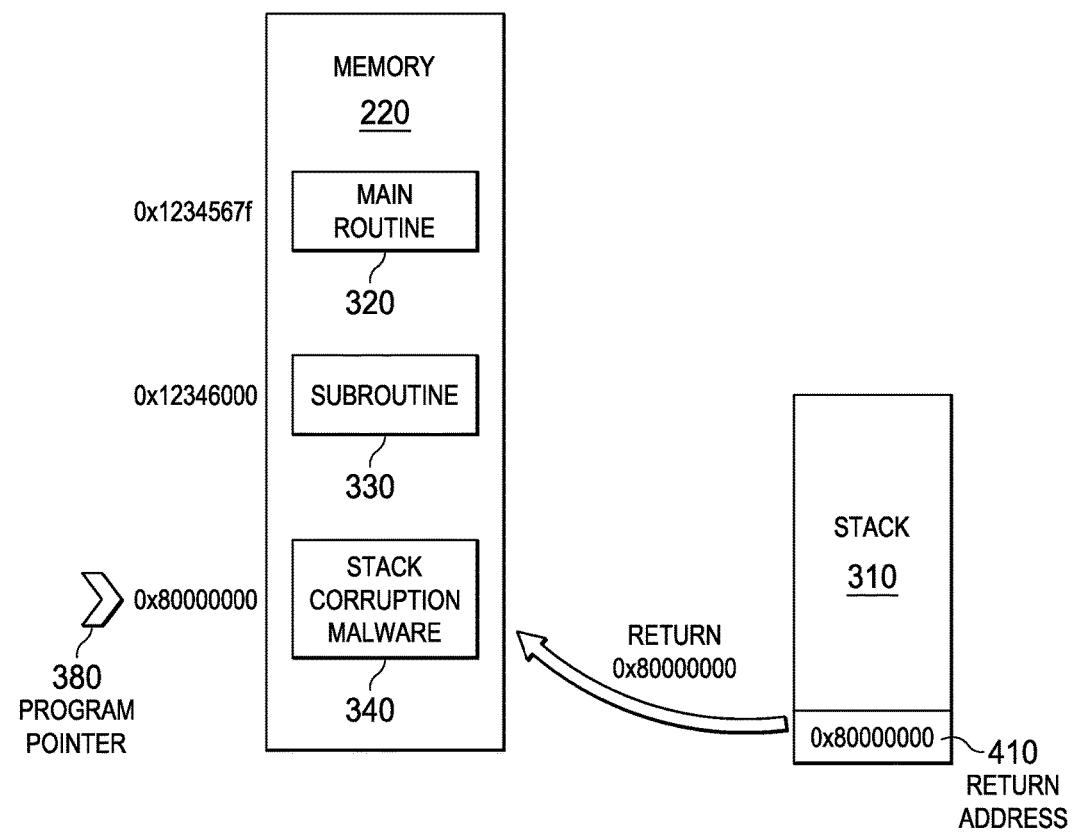
FIG. 6 is a block diagram of a computing operation according to one or more examples of the present Specification.

In FIG. 6, subroutine 330 issues the RET instruction with return address 0x80000000. Stack corruption malware 340 now has control of the system and may execute arbitrary commands. This may be particularly dangerous if main routine 320 is operating with elevated privileges. In that case, operating system 222 may provide malware 340 with those same elevated privileges. Thus, if main routine 320 is a low level driver, or other privileged process that has nearly unfettered access to system resources, stack corruption malware 340 has that same unfettered access.

To enhance security of computing device 110, the stack corruption attack of the preceding FIGURES should be prevented. Ideally, the value of initiating a stack corruption attack is reduced to the point that it is no longer worthwhile for attacker 180 to continue creating stack corruption software. However, if stack corruption malware 340 is successful in attacking return address 410, then at the very least, control should not pass to stack corruption malware 340.

FIGS. 7-12 disclose an example where an attempted attack on return address 410 is prevented from taking control of computing device 110.

Figure 7:
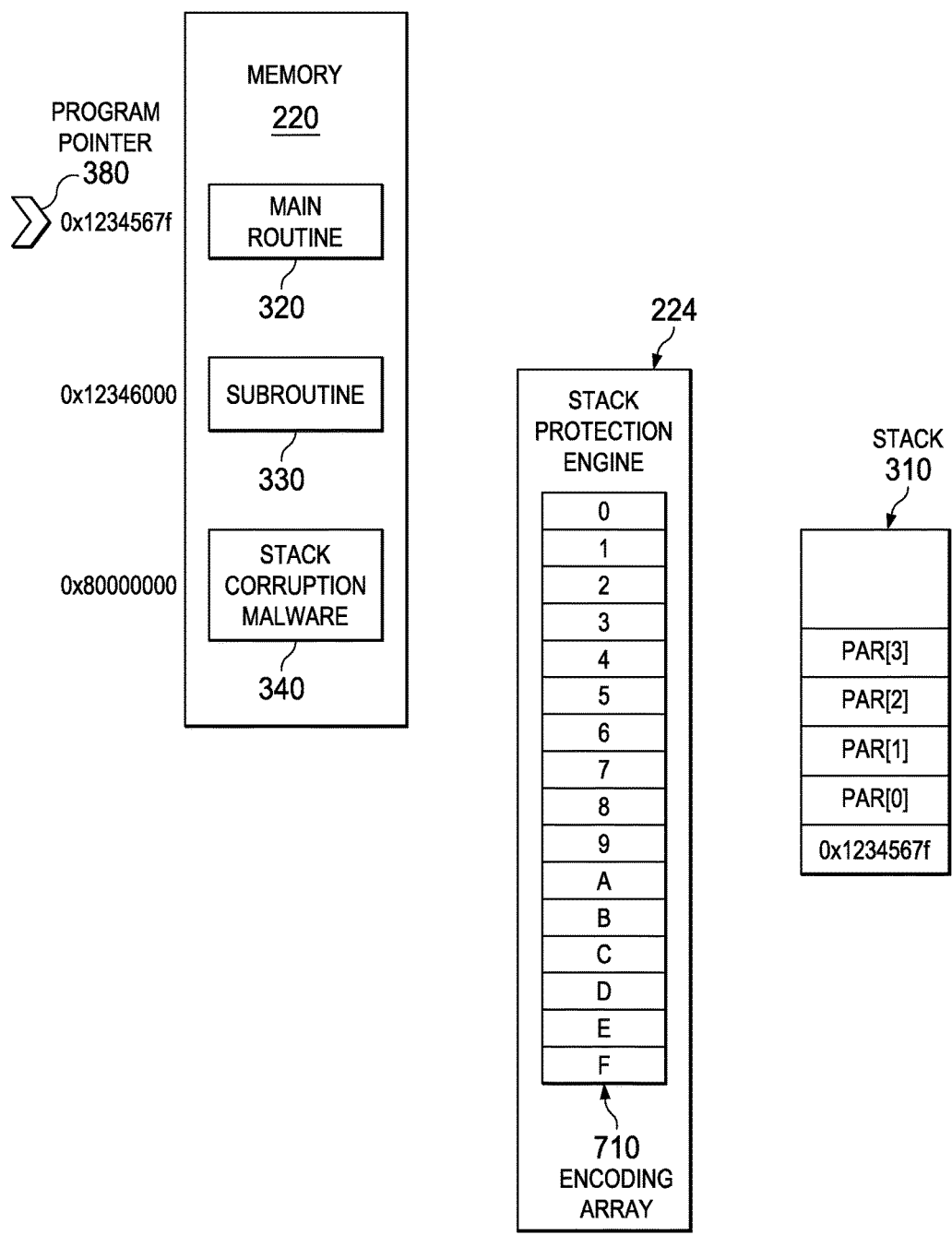
FIG. 7 is a block diagram of a computing operation according to one or more examples of the present Specification.

In FIG. 7, stack protection engine 224 is interposed between stack 310 and memory 220. In this example, stack protection engine 224 includes an encoding array 710. Encoding array 710 includes 16 encoding values, which may or may not be of the same bit width as a system address. If the same bit width is used, then the full return address is encoded, if a different value is used, then only a portion of the return address may be encoded, which may be sufficient in certain contexts.

In one example, stack protection 224 performs an exclusive or (XOR) of the provided address and the encoding value, and places the resulting value into return address 410. This is performed transparently to user applications. The result is that return address 410 is not a useable value by itself. It must be decoded first, for example by performing an XOR with the same value that was used to encode the address to begin with.

An encoding value from encoding array 710 may be selected for example based on a bit value within the provided address. If the least-significant four bits are used, then one of the sixteen values in encoding array 710 will be selected. These four bits are either left unencoded, or are encoded in a manner that is reversible separately from the encoding value, so that they can also be used to select the decoding value. For increased security, return address 410 may be a "write-only" memory value. Any attempt to read return address 410 will result in the address being decoded before it is returned. This prevents stack corruption malware 340 from attempting to defeat stack protection engine 224 by writing return addresses out to memory and reading them back to try to infer the values of encoding array 710.

Other encoding methods may be used. In general the encoding method need not be reversible; it need only be determinate. Thus, in another example, separate encoding and decoding keys could be used. In that case, an index value need not be left unencoded. Any scheme that results in the correct address being returned after decoding can be used.

For additional security, each encoding value may be pseudo-randomly selected, and may be replaced at appropriate times, such as at system boot time, or on a regular schedule. Both the pseudo-random nature of encoding values, and the regular replacement of values, may help to protect the security and integrity of stack protection engine 224. In one example, stack protection engine 224 writes a new pseudorandom value after each RET instruction so that even If stack corruption malware 340 somehow gleans an encoding value from encoding array 710, it will be useless. In another example, encoding array 710 may be a multi-dimensional array in which values are cycled in a round-robin fashion, or in which multiple bit values within an address may be used as multiple indices to further complicate attacks on stack protection engine 224.

The use of pseudorandom numbers, the regular replacement of values, the use of a multi-dimensional encoding array 710, and the use of a write-only memory, and other security measures described herein, are provided by way of example only. These are not intended to be limiting, and it is anticipated that a system designer will provide a security method according to the demands of a particular application.

Figure 8:
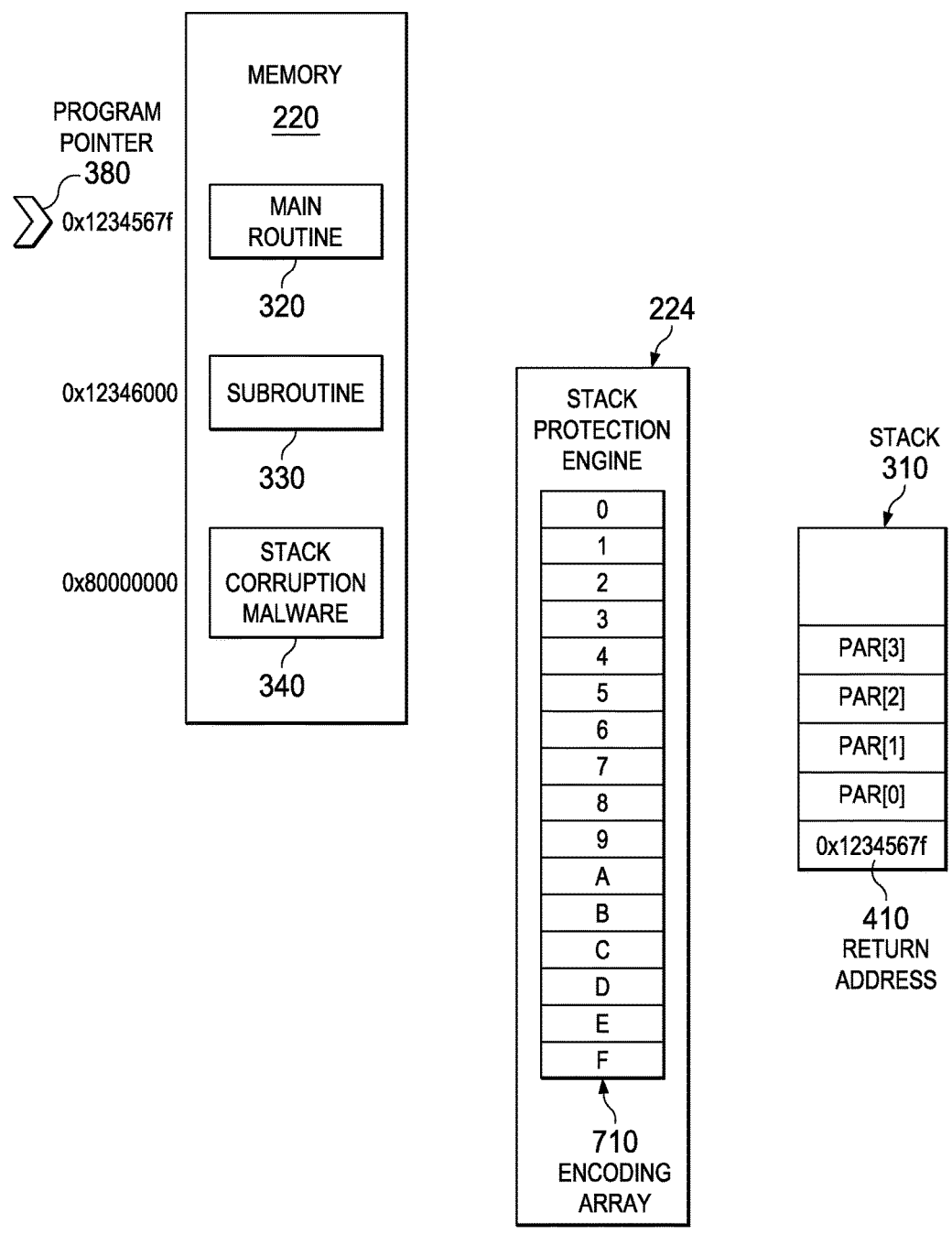
FIG. 8 is a block diagram of a computing operation according to one or more examples of the present Specification.

In FIG. 8, program pointer 380 points to main routine 320, located at memory address 0x1234567f.

Figure 9:
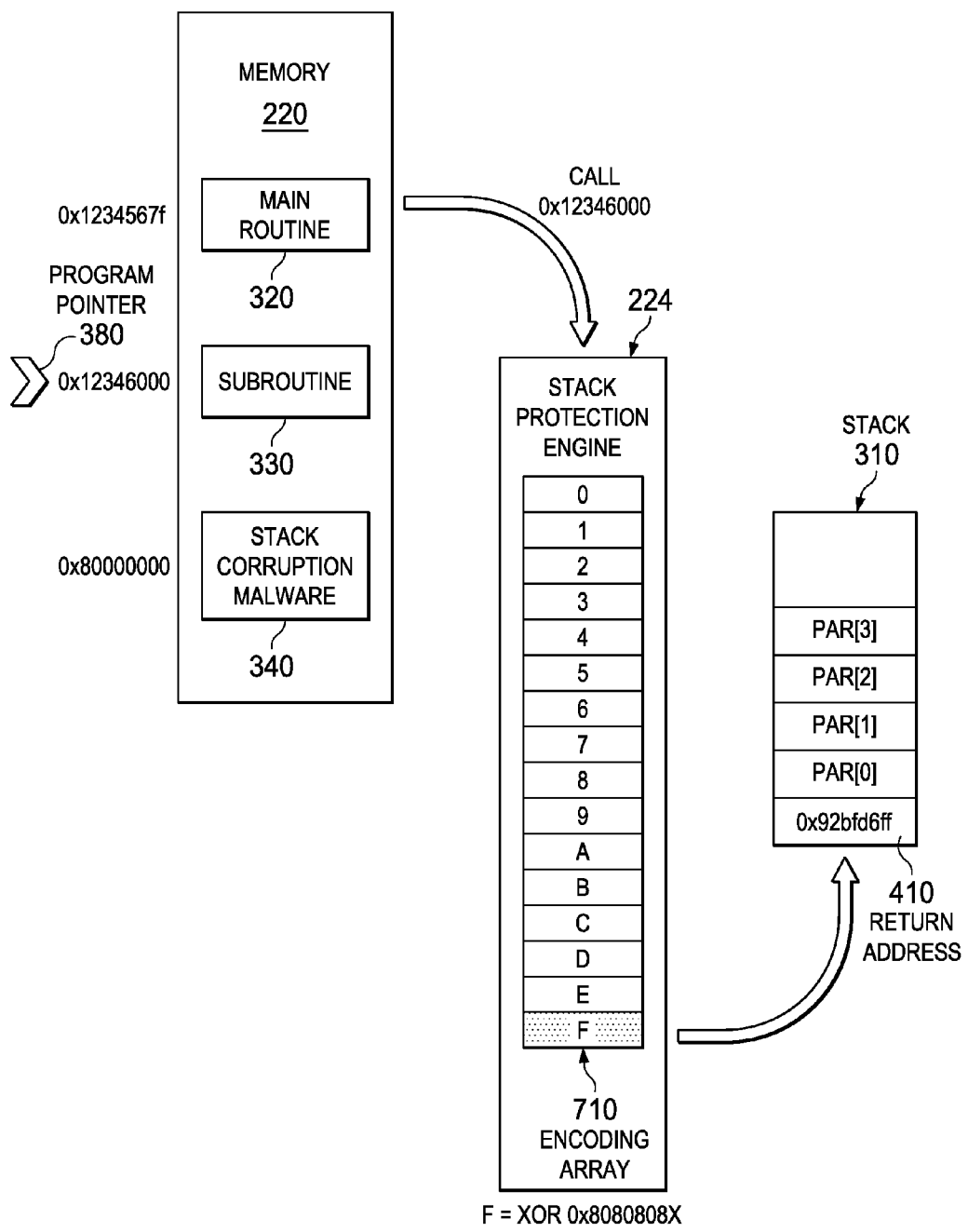
FIG. 9 is a block diagram of a computing operation according to one or more examples of the present Specification.

In FIG. 9, main routine 320 calls subroutine 330 located at address 0x12346000. Again, main routine 320 places return address 410 onto LIFO stack 310, and then places four additional parameters onto stack 310 for subroutine 330 to use as operands. Program counter 380 now points to address 0x12346000.

When main routine 320 places a value in return address 410, stack protection engine 224 encodes the address. In this case, encoding array 710 includes sixteen values, with the least four significant bits of return address 410 being used as an index. Encoding array 710 has the value 0x8080808X at position F, where "X" denotes that the last four bits are left unencoded to ensure that the index is preserved. This value is used to encode the address 0x1234567f. The result of 0x1234567f XOR 0x8080808X is 0x92bfd6ff. Stack protection engine 224 writes the value 0x92bfd6ff to return address 410. As described above, any attempt to read return address 410 directly will be intercepted, and the address will be decoded before the value is returned. This behavior may be encoded into the hardware of processor 210, making it difficult or impossible to circumvent, ensuring that stack corruption malware 340 cannot infer decoding value for encoding array 710. For example, in cases where return address 410 is a special register, any read or write operation to return address register 410 may be processed through special hardware or microcode configured to provide stack protection engine 224. In another case, return address 410 is provided by a write-only register, recognizing that in certain cases there are legitimate reasons to directly write to return address 410, but no user code is permitted to read from return address 410.

Because each value in encoding array 710 is different from other values in encoding array 710, a method is also provided for determining which value to use for encoding and decoding. In this example, the value 0x8080808X has been pseudo-randomly selected for position F. It should be noted that the values in encoding array 710 may or may not be the same as system address width.

In certain examples, it is sufficient to encode only a portion of the address. In one example, only the most significant bits are encoded by stack protection engine 224. In that case, the last four bits of the address will never be altered by stack protection engine 710, and may be used as an index. It should be noted that in any case where less than the full return address is decoded, any non-encoded position might be used by stack protection engine 224 as an index. Thus, for example, in a case where the least significant 32 bits of a return address are encoded in stack protection engine 224, the most significant four bits of the 64-bit address may be used as an index. In an example where the most significant 32 bits of a 64-bit address are encoded, the least significant four bits may be used.

In certain embodiments were less than the entire address is encoded, encoding the most significant bits may be selected as particularly suitable, as it will be more likely to produce a "garbage" return address in the case of a stack corruption attack. This is because using the most significant bits will produce a larger jump in memory, and is therefore not likely to result in an address in use by main routine 320 or by stack corruption malware 340. This is advantageous, because even though returning to a pseudorandom address will most likely result in a process crash and in no useful work being done, there is a small chance of inadvertent harm. It is possible in cases where main routine 320 has access to low level or important system resources that returning to a pseudorandom address may result in main routine 320 accidentally doing harm to the system. For example, if main routine 320 includes a database driver that writes to an important database, and stack protection engine 224 causes a return to a random address within main routine 320, the database driver may inadvertently write garbage values to the valuable database, or otherwise corrupt the database.

In another example, where main routine 320 is a controller, such as for a hard drive, jumping to a random address may cause inadvertent damage by sending spurious signals to the hard drive. Thus, encoding the most significant bits is more likely to lead to a jump to an address far removed from main routine 320, and therefore less likely to result in inadvertent harm the system.

In FIG. 9, when main routine 320 writes address 0x1234567f to stack 310, stack protection engine 224 encodes the address as 0x92bfd6ff.

Figure 10:
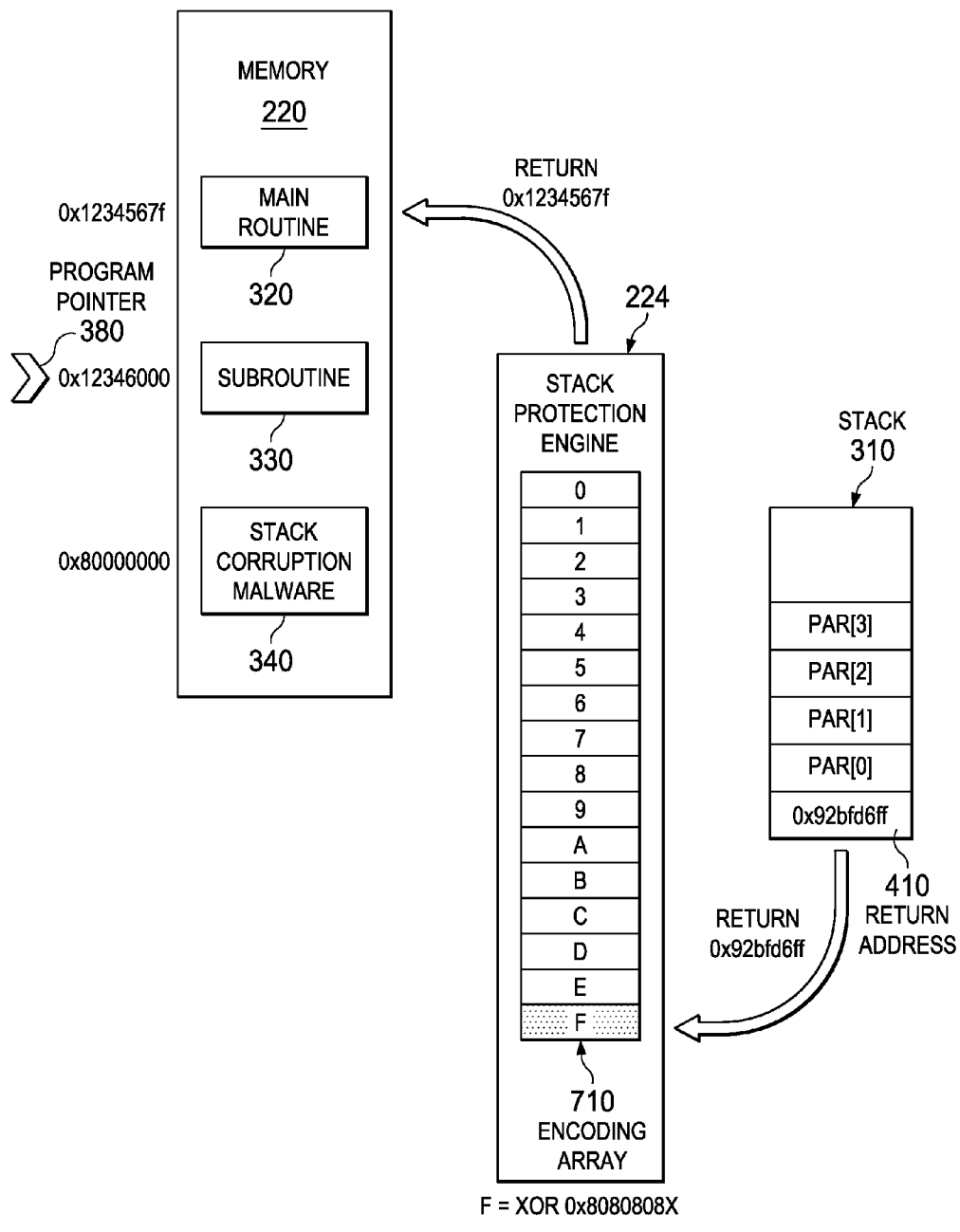
FIG. 10 is a block diagram of a computing operation according to one or more examples of the present Specification.

In FIG. 10, program pointer 380 points to address 0x12346000 in subroutine 330. Subroutine 330 uses parameters zero, one, two, and three, and then issues a RET instruction, which impliedly receives return address 410 as its operand. Stack protection engine 224 decodes the value 0x92bfd6ff, and returns control to address 0x1234567f.

Figure 11:
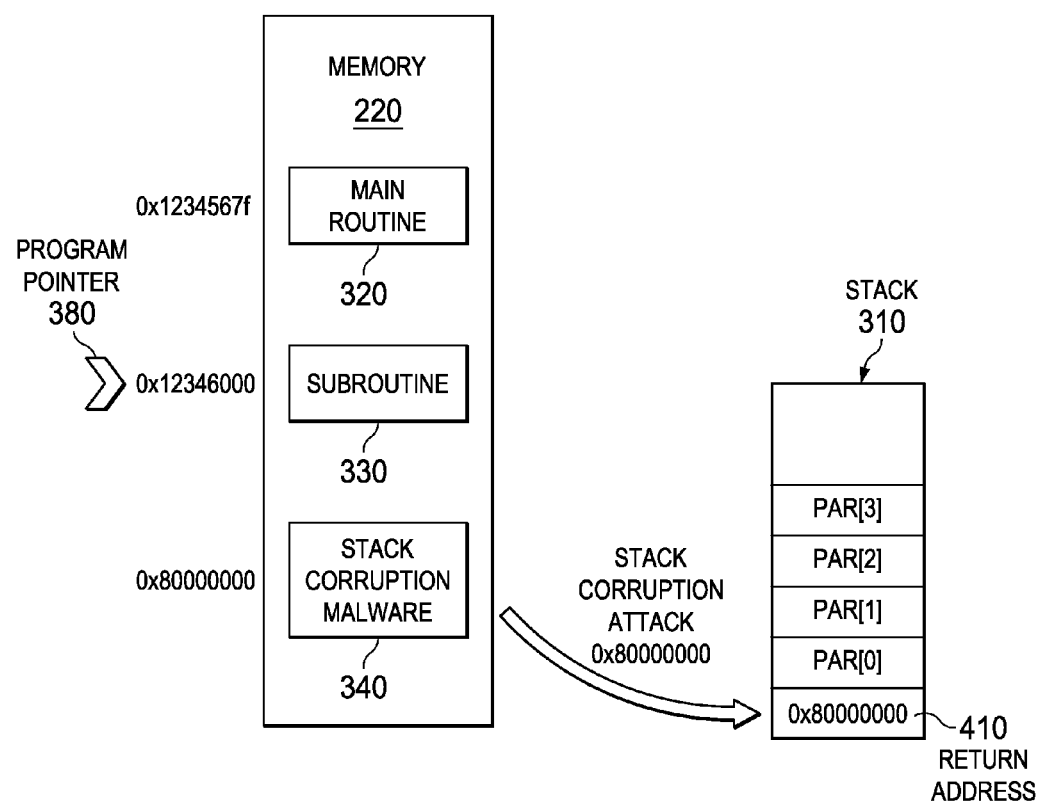
FIG. 11 is a block diagram of a computing operation according to one or more examples of the present Specification.

In the example of FIGS. 8-10, no stack corruption attack occurred. FIG. 11 represents a stack corruption attack that may occur between the disclosures in FIG. 8 and FIG. 9. In this example, main routine 320 has called subroutine 330 and placed a return value in return address 410, according to FIG. 8. Stack protection engine 224 has encoded return address 410 according to methods disclosed herein, so that return address 410 has the value 0x92bfd6ff.

In the stack corruption attack, stack corruption malware 340 places the return address of a malicious subroutine onto stack 310. In this case, the intent is that subroutine 330 will return control to stack corruption malware 340 when it finishes executing. Thus, address 0x80000000 is now in return address 410.

However, unlike the example of FIG. 5, the stack corruption attack is not successful.

Figure 12:
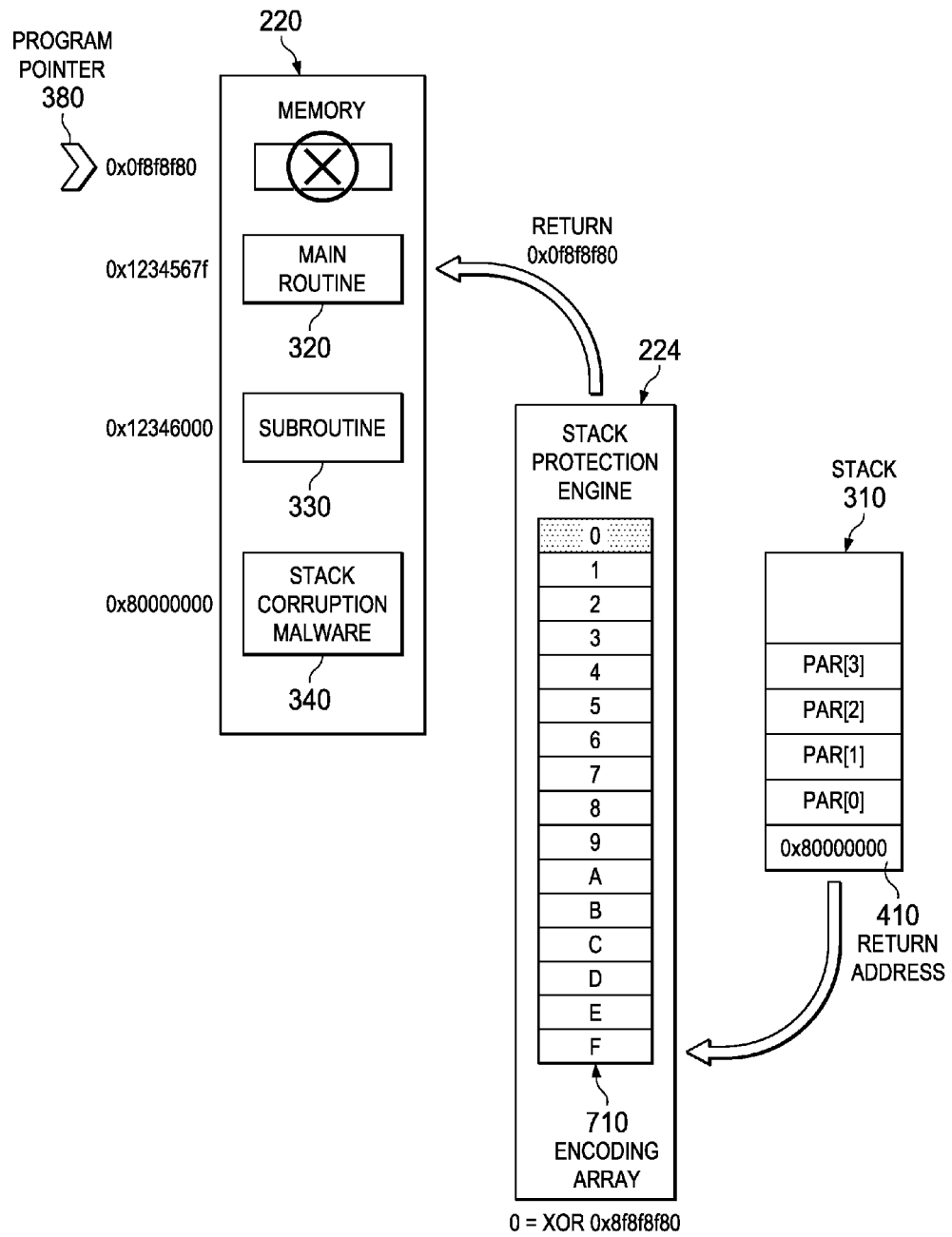
FIG. 12 is a block diagram of a computing operation according to one or more examples of the present Specification.

In FIG. 12, stack protection engine 224 decodes return address 410 before completing the RET instruction. However, return address 410 currently has the value 0x80000000. As before the last four bits are used as an index to encoding array 710, which in this example has the value 0x80808080 as its encoding value. Address 0x80000000 is "decoded" as address 0x8f8f8f80 (as before, the last four bits are left undisturbed). This is a valid address in memory 220, but it is not an address controlled by stack corruption malware 340. Indeed, this address may not contain an instruction at all. It may contain a datum, which may or may not coincidentally have the same value as some instruction opcode. If it does not, the program will simply crash. If the datum does coincidentally correspond to some opcode, it will most likely be a non sequitur to main routine 320, and thus is still most likely to result in main routine 320 crashing. Whatever datum is contained at address 0x0f8f8f8f80, it is astronomically unlikely to be an address that is both controlled by stack corruption malware 340 and that predictably performs some useful task on behalf of stack corruption malware 340.

FIG. 13 is a flow chart of a method 1300 performed by stack protection engine 224 according to one or more examples of the present Specification. It should be noted that the operations of method 1300 are disclosed by way of example only, and are disclosed in a particular order by way of example only. In certain embodiments, the operations of method 1300 may be provided in a different order where appropriate, appropriate operations may be omitted, and other operations not appearing in method 1300 may be interposed between the operations disclosed herein. Thus method 1300 should be understood as an illustrative example of a method performed by stack protection engine 224, and should not be construed as limiting in any way.

In block 1310, main routine 320 makes a call to subroutine 330.

In block 1320, stack protection engine 224 intercepts the subroutine call.

In block 1330, stack protection engine 224 encodes the return address provided by the subroutine call. This encoding may take any of the forms discussed herein, or any other suitable form of encoding.

In block 1340, stack protection engine 224 places the encoded return address onto stack 310 at return address 410.

Decision block 1350 waits for subroutine 330 to issue a RET instruction.

Once subroutine 330 issues a RET instruction, in block 1360 stack protection engine 224 decodes the return address according to methods described herein, or according to any other suitable method.

In block 1370, stack protection engine 224 encodes the return address.

In block 1380, stack protection engine 224 substitutes the decoded address for the encoded address.

In block 1382, control is returned to main routine 320.

According to methods disclosed in this example, if any other process has tampered with the return address, a garbage value will be the decoded and will be used as a return address, most likely resulting in a program crash.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in example 1, a computing device comprising a memory comprising a stack, the stack including a return address location; and a stack protection engine operable for: receiving a return address; encoding at least a portion of the return address with a cipher; and placing the return address in the return address location of the stack.

There is disclosed in example 2, the computing device of claim 1, wherein the stack protection engine is operable for decoding the return address.

There is disclosed in example 3, the computing device of claim 2, wherein the stack protection engine is operable for encoding at least a portion of the return address with a cipher after a call to a subroutine by a parent routine, and is operable for decoding the return address after a return from the subroutine to the parent routine.

There is disclosed in example 4, the computing device of claim 1, wherein the stack protection engine comprises a key array.

There is disclosed in example 5, the computing device of claim 4, wherein the stack protection engine is operable for using a portion of the return address as an index to the key array.

There is disclosed in example 6, the computing device of claim 4, wherein the stack protection engine is operable for assigning pseudo-random key values to the key array.

There is disclosed in example 7, the computing device of claim 6, wherein the stack protection engine is operable for refreshing the key array.

There is disclosed in example 8, the computing device of claim 7, wherein the stack protection engine is operable for refreshing the key array according to a periodic schedule.

There is disclosed in example 9, the computing device of claim 4, wherein the key array is write-only with respect to user-space processes.

There is disclosed in example 10, the computing device of claim 1, wherein the cipher is an exclusive or, and wherein encoding comprises selecting an encoding key from a key array.

There is disclosed in example 11, the computing device of claim 10, wherein the stack protection engine is further operable for decoding the return address with an exclusive or cipher.

There is disclosed in example 12, the computing device of claim 1, wherein the stack protection engine operates invisibly to user-space processes.

There is disclosed in example 13, the computing device of claim 1, wherein the stack protection engine comprises logic encoded on a microprocessor.

There is disclosed in example 14, logic encoded on one or more computer-readable mediums operable for providing a stack protection engine, wherein the stack protection engine is operable for: receiving a return address; encoding at least a portion of the return address with a cipher; and placing the return address in a return address location of a memory stack.

There is disclosed in example 15, the logic of claim 14, wherein the stack protection engine is operable for decoding the return address.

There is disclosed in example 16, the logic of claim 15, wherein the stack protection engine is operable for encoding at least a portion of the return address with a cipher after a call to a subroutine by a parent routine, and is operable for decoding the return address after a return from the subroutine to the parent routine.

There is disclosed in example 17, the logic of claim 14, wherein the stack protection engine comprises logic for providing a key array.

There is disclosed in example 18, the logic of claim 17, wherein the stack protection engine is operable for using a portion of the return address as an index to the key array.

There is disclosed in example 19, the logic of claim 17, wherein the stack protection engine is operable for assigning pseudo-random key values to the key array and for refreshing the key array.

There is disclosed in example 20, the logic of claim 19, wherein the stack protection engine is operable for refreshing the key array according to a periodic schedule.

There is disclosed in example 21, the logic of claim 17, wherein the key array is write-only with respect to user-space processes.

There is disclosed in example 22, the logic of claim 1, wherein the cipher is an exclusive or, and wherein encoding comprises selecting an encoding key from a key array.

There is disclosed in example 23, the logic of claim 10, wherein the stack protection engine is further operable for decoding the return address with an exclusive or cipher.

There is disclosed in example 24, a method for providing a stack protection engine, comprising: receiving a return address; encoding at least a portion of the return address with a cipher after a call to a subroutine from a parent routine; and placing the return address in a return address location of a memory stack.

There is disclosed in example 25, the method of example 24, further comprising decoding the return address after a return from the subroutine to the parent routine.

There is disclosed in an example 26, a method comprising the performing the instructions disclosed in any of examples 14-23.

There is disclosed in example 27, an apparatus comprising means for performing the method of example 26.

There is disclosed in example 28, the apparatus of example 27, wherein the apparatus comprises a processor and memory.

There is disclosed in example 29, the apparatus of example 28, wherein the apparatus further comprises a computer-readable medium having stored thereon software instructions for performing the method of example 26.

What is claimed is:

1. A computing device comprising:
   a memory comprising a stack, the stack including a return address location; and
   a stack protection engine, implemented at least partly on a hardware platform and comprising a key array, the stack protection engine operable for:
   receiving a return address;
   encoding at least a portion of the return address with a cipher with a key from the key array, comprising using a portion of the return address as an index to the key array; and
   placing the return encoded address in the return address location of the stack.

2. The computing device of claim 1, wherein the stack protection engine is operable for decoding the return address.

3. The computing device of claim 2, wherein the stack protection engine is operable for encoding at least a portion of the return address with a cipher after a call to a subroutine by a parent routine, and is operable for decoding the return address after a return from the subroutine to the parent routine.

4. The computing device of claim 3, wherein the stack protection engine is operable for assigning pseudo-random key values to the key array.

5. The computing device of claim 4, wherein the stack protection engine is operable for refreshing the key array.

6. The computing device of claim 5, wherein the stack protection engine is operable for refreshing the key array according to a periodic schedule.

7. The computing device of claim 3, wherein the key array is write-only with respect to user-space processes.

8. The computing device of claim 1, wherein the cipher is an exclusive or, and wherein encoding comprises selecting an encoding key from the key array.

9. The computing device of claim 8, wherein the stack protection engine is operable for decoding the return address with an exclusive or cipher.

10. The computing device of claim 1, wherein the stack protection engine operates invisibly to user-space processes.

11. The computing device of claim 1, wherein the stack protection engine comprises logic encoded on a microprocessor.

12. Logic encoded on one or more tangible, non-transitory computer-readable mediums operable for providing a stack protection engine, implemented at least partly on a hardware platform and comprising a key array, wherein the stack protection engine is operable for:
receiving a return address;
encoding at least a portion of the return address with a cipher with a key from the key array, comprising using a portion of the return address as an index to the key array; and
placing the return encoded address in a return address location of a memory stack.

13. The logic of claim 12, wherein the stack protection engine is operable for decoding the return address.

14. The logic of claim 13, wherein the stack protection engine is operable for encoding at least a portion of the return address with a cipher after a call to a subroutine by a parent routine, and is operable for decoding the return address after a return from the subroutine to the parent routine.

15. The logic of claim 14, wherein the stack protection engine is operable for assigning pseudo-random key values to the key array and for refreshing the key array.

16. The logic of claim 15, wherein the stack protection engine is operable for refreshing the key array according to a periodic schedule.

17. The logic of claim 14, wherein the key array is write-only with respect to user-space processes.

18. The logic of claim 12, wherein the cipher is an exclusive or, and wherein encoding comprises selecting an encoding key from the key array.

19. The logic of claim 18, wherein the stack protection engine is operable for decoding the return address with an exclusive or cipher.

20. A method for providing a stack protection engine, implemented at least partly on a hardware platform and comprising a key array, the stack protection engine operable for:
receiving a return address;
encoding at least a portion of the return address with a cipher with a key from the key array, comprising using a portion of the return address as an index to the key array after a call to a subroutine from a parent routine; and
placing the return encoded address in a return address location of a memory stack.

21. The method of claim 20, further comprising decoding the return encoded address after a return from the subroutine to the parent routine.

* * * * *